No. 632,648. Patented Sept. 5, 1899.
N. DENNING.
CORN HARVESTER AND SHOCKER.
(Application filed July 15, 1898.)
(No Model.) 4 Sheets—Sheet 1.

Witnesses
Gladys L. Thompson.

Inventor
Newton Denning
by
Lacey
His Attorneys

No. 632,648. Patented Sept. 5, 1899.
N. DENNING.
CORN HARVESTER AND SHOCKER.
(Application filed July 15, 1898.)

(No Model.) 4 Sheets—Sheet 2.

Witnesses

Inventor
Newton Denning
by R. H. Lacey his Attorneys

No. 632,648. Patented Sept. 5, 1899.
N. DENNING.
CORN HARVESTER AND SHOCKER.
(Application filed July 15, 1898.)

(No Model.) 4 Sheets—Sheet 3.

Witnesses
Inventor
Newton Denning
by R. H. Lacey
his Attorney

No. 632,648. Patented Sept. 5, 1899.
N. DENNING.
CORN HARVESTER AND SHOCKER.
(Application filed July 15, 1898.)
(No Model.) 4 Sheets—Sheet 4.
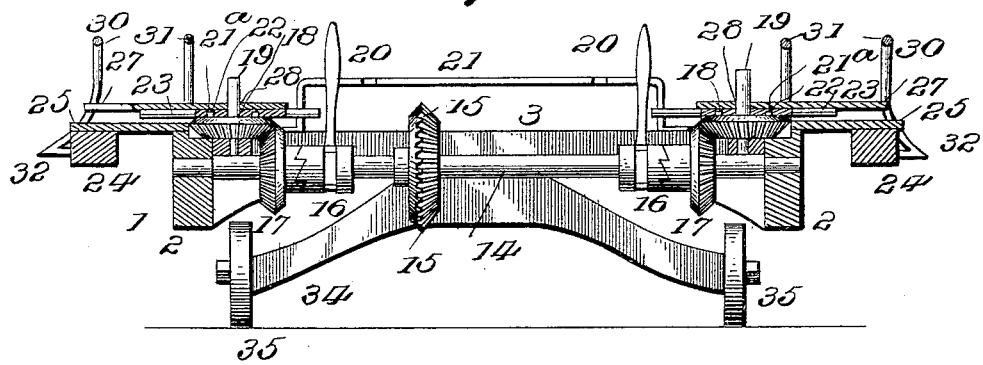
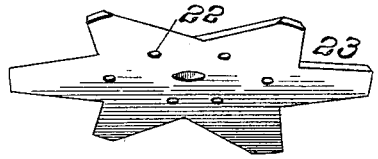
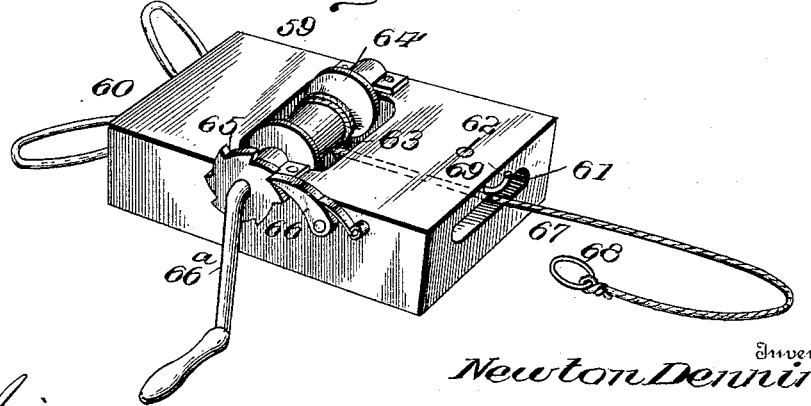
Witnesses
Gladys L. Thompson
Inventor
Newton Denning
by
His Attorneys

UNITED STATES PATENT OFFICE.

NEWTON DENNING, OF HUTCHINSON, KANSAS.

CORN HARVESTER AND SHOCKER.

SPECIFICATION forming part of Letters Patent No. 632,648, dated September 5, 1899.

Application filed July 15, 1898. Serial No. 686,021. (No model.)

*To all whom it may concern:*

Be it known that I, NEWTON DENNING, a citizen of the United States, residing at Hutchinson, in the county of Reno and State of Kansas, have invented certain new and useful Improvements in Corn Harvesters and Shockers; and I do hereby declare the following to be a full, clear, and exact description of the invention, such as will enable others skilled in the art to which it appertains to make and use the same.

This invention relates to corn harvesters and shockers; and it consists of the construction and arrangement of parts, which will be more fully hereinafter described and claimed.

The object of the invention is to expedite the operations of cutting and shocking corn or analogous growths and dispense with the tedious expense of labor and time usually required in hand cutting and binding and also to materially reduce the number of persons ordinarily employed to practically and effectually perform such operations.

Figure 1:
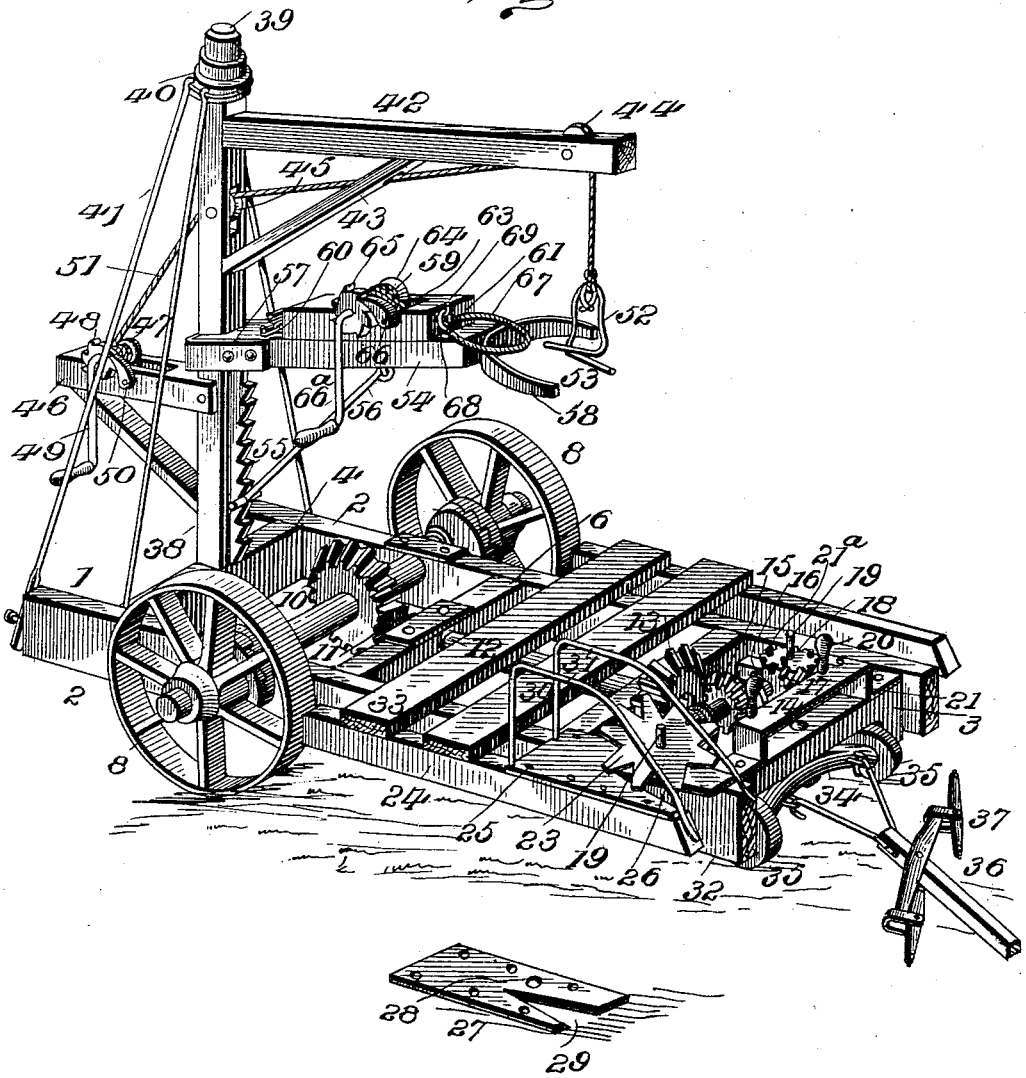
Figure 2:
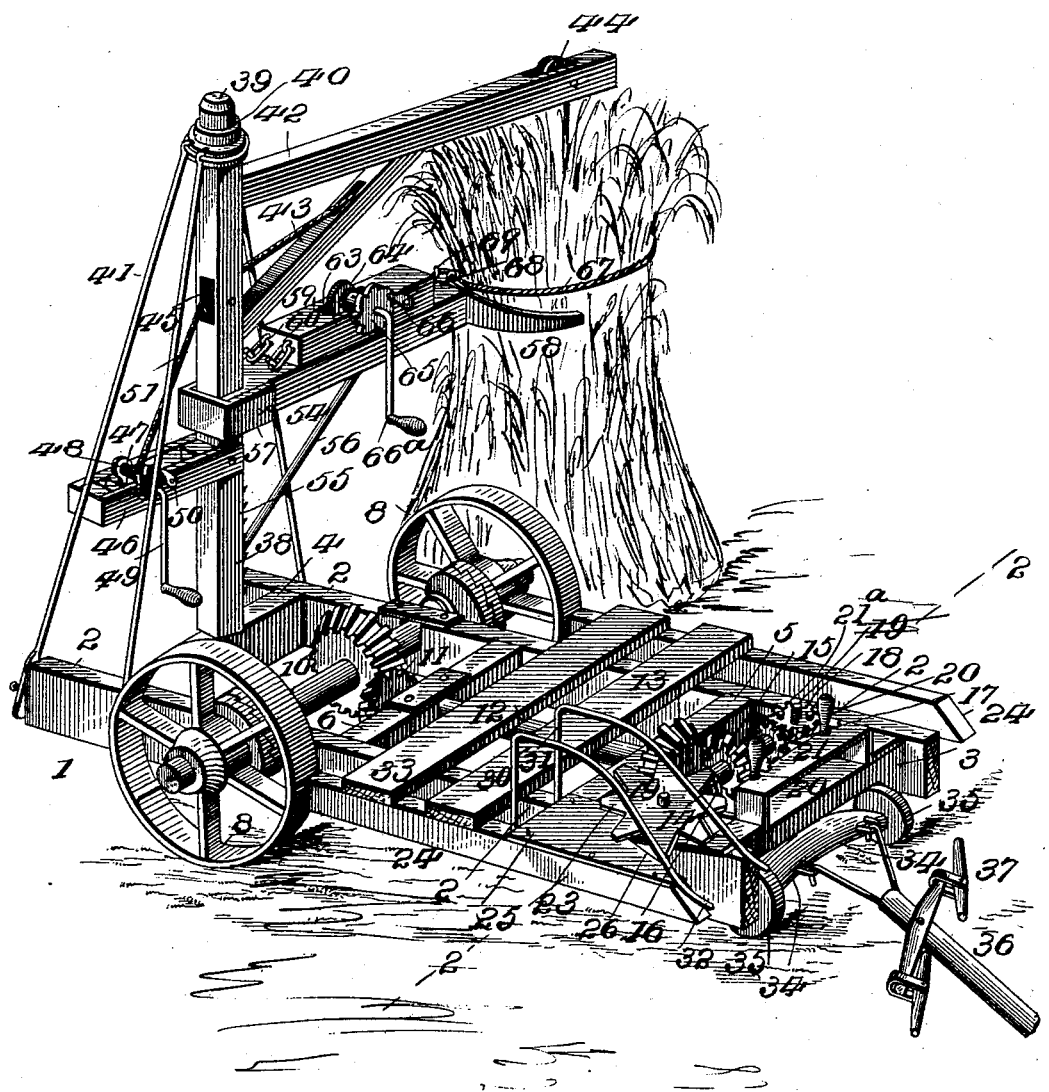
Figure 3:
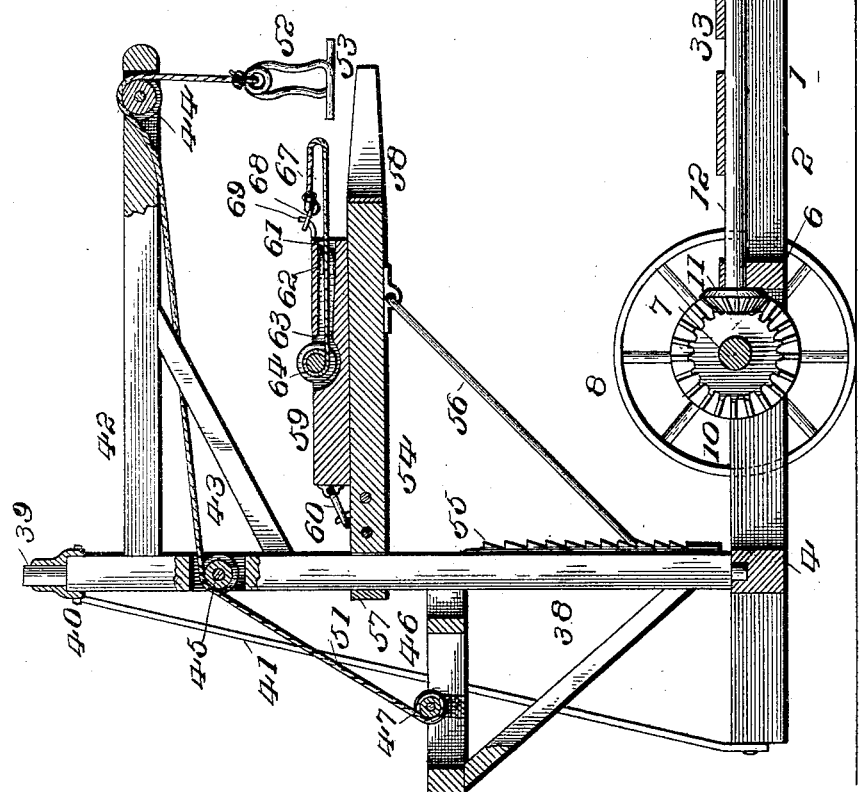

In the accompanying drawings, Figure 1 is a perspective view of a corn harvester and shocker embodying the invention and having a part removed and shown to one side of the main figure. Fig. 2 is a similar view showing the parts arranged to deliver the shock at one side of the machine. Fig. 3 is a longitudinal vertical section. Fig. 4 is a transverse vertical section on the line 2 2, Fig. 2. Fig. 5 is a detail perspective view of one of the gears for supporting one of the cutting-disks. Fig. 6 is a detail perspective view of one of the cutting-disks shown inverted. Fig. 7 is a detail perspective view of the binding-block.

Referring to the drawings, wherein similar numerals are used to indicate corresponding parts in the several views, the numeral 1 designates a frame composed of parallel side beams 2, connected at front and rear by cross-beams 3 and 4 and also by intermediate beams 5 and 6. The said side and intermediate beams form supports for the different mechanisms, and mounted in suitable bearings in the beams 2 is an axle 7, which is located nearer the rear portion of the frame and between the cross-beams 4 and 6. The outer ends of the axle project beyond the beams 2 a suitable distance and have thereon ground-wheels 8 of proper diameter and tread. The ground-wheels run loose on the axle and to the inner portions of the hubs thereof have clutch members or analogous gripping devices secured to engage the outer portions of clutch-disks on the axle, which will be readily understood, and whereby the said wheels can run freely in a rearward direction and permit the machine to be turned or backed without operating the cutting mechanism. On the axle a beveled gear 10 is keyed and meshes with a beveled pinion 11 on the rear end of a shaft 12, running longitudinally of the frame, a little to one side of the center, so that the gear will not come in contact with the stubs over which the machine passes. The shaft 12 has bearing in the two intermediate cross-beams 5 and 6, and on the front end, immediately in advance of the beam 5, another beveled pinion 13 is fixed to rotate with said shaft.

Between the front cross-beam 3 and the adjacent intermediate cross-beam 5 a counter-shaft 14 is located and journaled at opposite ends in the side beams 2. On this counter-shaft a beveled pinion 15 is secured, which transmits motion from the pinion 13 on the shaft 12, and on opposite sides of said pinion 15 clutch-sleeves 16 are feathered on the shaft 14, and at their outer ends have beveled gear-heads 17, which are thrown into and out of connection with horizontally-disposed opposite beveled pinions 18 on short vertical shafts 19, mounted in suitable bearings on the adjacent inner portions of the side beams 2. The said sleeves are shifted by levers 20, having portions engaging adjacent clutches and vertical stems supported by and journaled in an arched brace 21, fastened at opposite ends to the front cross-beam 3. These levers are adapted to be operated by any preferred form of device, such as a hand-bar, crank, or analogous implement. The shafts 19 extend above the upper surface of the frame 1 a short distance, and the upper face of each of the pinions 18 is provided with a series of projections 21ª, which are fitted in corresponding sockets 22 on the under side of a cutting-disk 23, fitted over the said shafts 19 in each instance. Each of the said cutting-disks has a series of notches therein to form teeth having sharp edges and adapted to cut the stalks as they are brought in line therewith.

In advance of the ground-wheels and attached to the outer portions of the side beams 2 are supporting-rails 24, having their upper edges on a level with the adjacent top edges of said side beams. Secured to the side beams 2, adjacent the front ends of the same and extending over and also attached to the said supporting-rails 24, are opposite cutting-plates 25, lying directly under the cutting-disks 23 and having at their front edges V-shaped recesses 26, which are open at the front and have their opposite walls sharpened to provide throats, which are placed in alinement with the row of corn to be cut.

Over each of the cutting-disks and cutting-plates a cover-plate 27 is mounted and has an opening 28 therethrough, which is fitted over the projecting end of the shaft 19, the outer edge of the cover-plate alining with the outer edge of the cutting-plate, and at the front the said cover-plate is formed with a substantially V-shaped recess 29, with its opposite walls sharpened and adapted to coincide with the recess 26 in the said cutting-plate. These cover-plates shield and protect the cutting-disks, but do not interfere with the free rotation thereof by instituting any undue friction and may be removed at any time to reach the cutting-disks and the parts below for any purpose that may be desired.

Over each of the cover-plates and the parts beneath a guard 30 is mounted consisting of opposite rods 31, having rear vertical portions secured to the top edges of the side beams 2 and the supporting-rails 24, and from the upper terminations of the said vertical portions the rods gradually slope downwardly toward the front and are continued in the form of forwardly-projecting fingers 32 in advance of the front ends of the said side beams and rails and so positioned as to conduct the cornstalks to the cutting apparatus. After a severing operation has ensued the said stalks are held upright between the opposite parts of the guard and can be freely drawn through the rear part of the latter. In rear of the guards and extending transversely across the frame 1 is a platform 33 to serve as a foothold for an operator and also to stand the cut stalks thereon for the purpose of shocking the same in a manner which will be presently described.

To the front of the frame 1 an arched axle 34 is movably attached and is provided with small ground-wheels 35, which are located under the front cross-beam 3. To said axle a tongue 36 is connected and has thereon suitable draft devices 37. All the geared mechanism is shielded or boxed on the under side to prevent injury thereto, and likewise, if found practicable, it may be covered at the top.

In the rear cross-beam 4 a suitable socket is formed to receive the lower stepped end of an upright or post 38, having an upper reduced end 39, over which is movably mounted a metallic collar 40, provided with a base-flange, to opposite portions of which stays or braces 41 are secured at their upper ends and also at their lower ends to different parts of the frame. The post or upright 38 is intended to be constructed of wood of a hard nature and has free rotatable movement within the confines of the stays or braces 41. The rear end of a horizontal arm 42 is connected to the post or upright 38, near the upper end thereof, said arm also being made of wood and reinforced to sustain considerable weight by an oblique brace 43, attached thereto, and an adjacent portion of the said post or upright. In a slot in the outer end of the arm 42 a sheave or pulley 44 is rotatably mounted, and in the post or upright 38, just above the point where the brace 43 is attached thereto, a slot is also formed to rotatably receive the sheave or pulley 45. Also secured to the post or upright 38 and projecting therefrom is a short arm 46, upon which a small windlass 47 is rotatably mounted, having attached to one end thereof a ratchet-wheel 48 and operated through the medium of a crank-handle 49. On one side of the said short arm 46 a pawl 50 is pivotally mounted and adapted to engage the ratchet-wheel 48 to sustain the adjustment of said windlass, and running from the latter over the sheave or pulley 45 and also the sheave or pulley 44 is a rope, cable, or analogous device 51, which depends from the said sheave or pulley 44 and is loosely attached to the upper portions of hooks 52, having also inwardly-projecting horizontal ends 53, which are freely adjustable and are applied to opposite portions of a shock when completed.

Adjustably mounted on the post or upright 38 is a support 54, extending forwardly and having a rear slotted end to embrace the said post or upright. Vertically-alined ratchet-teeth 55 are located on the lower front portion of the post or upright, and to the under side of the said support 54 a brace 56 is movably attached and has a lower reduced end adapted to engage the said ratchet-teeth and hold the said support 54 at a proper elevation relatively to the length of the cornstalks from which the shock is formed. The support 54 is held in connection with the post or upright 38 by a metallic band 57, attached to the rear end and extending across the rear portion of said post or upright, and at its front end the support has a metallic bow or former 58 secured thereto, which is of such curvature as to accommodate the formation of shocks of varying diameters.

Removably mounted on the support 54 is a binding-block 59, which is attached by links 60 at the rear end, engaging suitable connecting devices on the said support. An opening 61 is formed in the front portion of the said block, and at the extreme outer part thereof a pulley 62 is mounted. The said opening 61 communicates with a slot or recess 63 in the top of the said block, in which a smaller windlass 64 is mounted and has attached to one end thereof a ratchet-wheel 65, which is engaged by a pawl 66 on the adjacent side of the block. A crank-handle 66ª is connected to the windlass for operating the same, and surrounding said windlass is a binding rope, cable, or analogous device 67, which passes outwardly through the opening 61 over the pulley 62 and has a link 68 at the rear end thereof, which is thrown over the hook 69 when binding the shock before it is delivered from the machine.

In operation one side of the machine is placed in alinement with the row of cornstalks to be cut, and in the progress of the same the stalks are directed through the guard at that side to the cutting devices and first forced into the recesses 26 and 29 in the plates 25 and 27, respectively, and the rotating cutting-disk severs each stalk with a clean cut, and as it is severed it passes over the cover-plate between the opposite portions of the guard and is caught by the operator standing on the platform 33, who places the cut stalks in the bow or former 58, and after enough have been gathered to form a shock the binding-rope 67 is thrown around the said completed shock and the link on the end of said rope attached to its hook on the binding-block. The crank-handle 66ª is then rotated to wind the binding-rope on the windlass 64, and the tension is sustained through the ratchet and pawl devices coacting with said windlass. The hooks 52 are then applied to the bound shock, and the latter is then lifted by operating the windlass 47 through the medium of the rope, cable, or analogous device 51, and the crane, as formed by the upright or post 38 and the arm 42, is swung to one side and the said rope, cable, or analogous device 51 is slackened sufficiently to permit the shock to be rested on the ground. At the same time the binding-block 59 is disconnected from the support 54 to keep the binding-rope 67 in place, and after the shock is so positioned the binding-twine or other material is applied by the operator, who alights on the same side of the machine, and the binding-rope is then released, the binding-block readjusted, and the crane returned to a proper position over the machine for the purpose of forming another shock. The operation can be readily carried on in succession, and it will be understood that all the parts are readjusted in accordance with the primary predetermined gage required at each time the crane is swung back over the frame.

By having the cutting devices arranged on opposite sides of the front of the frame a turning of the machine to either the right or left will always position the parts in working position, so that successive rows may be easily cut and shocked. It is intended also that the shocks be deposited with regularity, and at the same time the crane swings over either side of the machine to deposit the shock on the ground the machine is stopped until the parts are again in position for forming another shock. The mechanism is also conveniently arranged, so that a driver and one operator are all the attendants necessary to rapidly and successively carry on the harvesting and shocking.

It is obviously apparent that changes in the proportions, dimensions, and minor details of construction and arrangement might be resorted to without in the least departing from the nature or spirit of the invention or sacrificing any of the advantages thereof.

Having thus described the invention, what is claimed as new is—

1. In a corn harvester and shocker, the combination of a wheeled frame having cutting devices at the front end thereof, a swinging crane mounted on the rear part of the frame, a lifting device operated in the said crane, a support adjustably mounted on the crane and having a bow or former at one end, and a binding-block having links at the rear end removably engaging holding devices on the said support and having a binding-rope or analogous device adjustably attached thereto.

2. In a corn harvester and shocker, the combination of a wheeled frame having cutters at the front end thereof, a crane adjustably mounted on the rear portion of said frame and having a forwardly-projecting arm with a sheave or pulley in the outer end thereof and also of itself having a sheave or pulley therein, a rearwardly-extending arm attached to the said crane and having a windlass and ratchet-and-pawl mechanism attached thereto, a rope or analogous device engaging the said windlass and passing over the sheaves or pulleys and having on the free end thereof engaging hooks, a support adjustably mounted on the said crane and arranged in horizontal position, the free end of said support having a bow or former thereon, and a binding-block having links at the rear end removably engaging holding devices on said support and having a binding-rope adjustably carried thereby.

3. In a corn harvester and shocker, the combination of a wheeled frame having cutters at the front end thereof, a crane movable on the rear part of said frame and consisting of an upright or post with an upward forwardly-projecting arm, a lifting device adjustably mounted in the said crane, a vertically-alined series of ratchet-teeth on the lower part of the upright or post of the crane, a support adjustable on the said post or upright of the crane and having a movable brace, the lower end of said brace being adapted to engage the said ratchet-teeth, and the front end of said support provided with a bow or former, a binding-block removably and disconnectibly resting on the said support, the said block having links connected to the rear end thereof adapted to engage holding devices on the support and a binding-rope adjustably and movably attached to the said binding-block.

In testimony whereof I affix my signature in presence of two witnesses.

NEWTON DENNING.

Witnesses:
R. C. HODGE,
W. H. DENNING.